Patented July 28, 1925.

1,547,186

UNITED STATES PATENT OFFICE.

JOHN MORRIS WEISS, OF NEW YORK, N. Y.

SULPHONATION OF BENZENE.

No Drawing.   Application filed June 28, 1923. Serial No. 648,397

*To all whom it may concern:*

Be it known that I, JOHN MORRIS WEISS, a citizen of the United States, and residing at 210 West 110th Street, in the city of New York and State of New York, have invented certain new and useful Improvements in the Sulphonation of Benzene, of which the following is a specification.

In the manufacture of resorcin, benzene is sulphonated with sulphuric acid to form benzene disulphonic acid, the sulphonic acid transformed to its sodium salt and this fused with caustic soda to form sodium resorcinate. In the fusion the presence of sodium sulphate in the sodium benzene disulphonate, if the sulphate is not in excess of 15% of the dry salt, does not exert any substantially harmful effect on the fusion nor does it interfere in any material way with the processes following the fusion by means of which the resorcin is isolated.

In the prior art, the sulphonation of benzene has been carried on using various strengths of sulphuric acid of which the strongest used was that commercially known as 20% oleum containing 20% of uncombined sulphur trioxide. This invariably results in a mixture of mono and disulphonic acids of benzene containing a very considerable quantity of free sulphuric acid so that if neutralized directly with sodium carbonate, a sulphonate salt is obtained which has such a high sulphate content as to make its use for fusion with caustic impractical and uneconomical. This sulphate content would be always over 25% and more usually 30–40%. Accordingly, in practice the sulphonic acid-sulphuric acid mixture is removed as insoluble calcium sulphate. This, of course, requires a filtration or decantation operation which is costly and further, results in some loss of product. Many inventors have attempted to reduce the amount of free sulphuric acid present. Downs (U. S. Patents 1,279,295 and 1,301,785) proposes to distil the mixed sulphuric and sulphonic acids under vacuum, thereby removing sulphuric acid and obtaining a sulphonic acid sufficiently free from sulphuric acid so that it can be directly neutralized with sodium carbonate to form a sulphonate salt suitable for the caustic fusion. Downs (U. S. Patent 1,321,994) also proposes to cause benzene and sulphur trioxide to react in the vapor phase and condense therefrom a sulphonic acid free from sulphuric acid. Ambler and Gibbs (U. S. Patent 1,300,228) propose to pass benzene vapor up a tower in countercurrent to a stream of sulphuric acid and by carrying off the water of reaction, continue sulphonation until the sulphuric acid content of the mixture is materially reduced. Tyrer (U. S. Patent 1,210,725) proposes to pass the benzene vapor in excess through sulphuric acid thereby benzene-distilling the water of reaction and accomplishing the same result as Ambler and Gibbs, the excess benzene being returned to the process. Dennis (U. S. Patent 1,212,612) proposes to separate the sulphonic acid substantially free from sulphuric acids by means of an immiscible solvent which will dissolve the former but not the latter. There have also been other proposals which amount only to specific modifications of one or another of the processes cited.

All of these expedients, however, require special apparatus to carry out the process and cannot be adapted to the ordinary equipment usually used for sulphonation.

I have discovered in the sulphonation of benzene that if an oleum, materially stronger than has been used in the past, is employed, that sulphonic acids can be obtained directly which contain a sufficiently low amount of free sulphuric acid to render it practical, economical and desirable to neutralize it directly with sodium carbonate or caustic soda to form the sulphonate salt for use in the fusion. The strength of oleum should not be below 58% free $SO_3$ and I prefer to use a strength of approximately 65% free $SO_3$. At strengths of over 70% free $SO_3$, the oleum melts at a too elevated temperature to render its use desirable.

To particularly illustrate my invention, the following example is given but I do not intend to be limited by the proportions of material, strength of acid, temperature or other conditions stated specifically in the example which is for illustrative purposes only.

One hundred parts by weight of benzene are taken and two hundred thirty two parts of 65% oleum are run in slowly with stirring using cooling to keep the temperature of the reacting mixture below 30° C. The system should be closed to prevent absorption of moisture by the strong acid. After all the oleum has been added, the temperature is raised during a period of about an hour to 70° C., for a second hour to 250° C., for a third hour to 275° C. and finally for about 30 minutes to 300° C., being stirred continually and heated from an even source of heat such as circulating oil heating, so as to avoid superheating.

The reaction is then complete, the mass is allowed to cool to about 200° C. and transferred to storage. The sulphonic acids obtained will consist of about 9 to 10% of sulphur trioxide in the form of free sulphuric acid and the balance sulphonic acids of benzene of which from 80 to 90% is the benzene disulphonic acid. The mass can be directly neutralized with sodium carbonate or caustic soda and the resultant salt on the dry basis will contain less than 15% of sodium sulphate. For this neutralization it is possible to use an alkali solution of such strength that the sulphonic acid salt is obtained as a water solution of proper strength to run directly without concentration into the fusion process. Moreover, it may be neutralized with by-product sodium sulphite from the fusion process and this may result in a double economy, first, in saving sodium carbonate and, second, the liberated sulphur dioxide may be used to acidify sodium resorcinate to liberate the resorcin and thereby save part of the sulphuric acid usually used for this purpose. The exact method of neutralization is not an essential of this invention which, in short, is the sulphonation of benzene to form a preponderance of benzene disulphonic acid, using a sulphuric acid containing between 58 and 70% free sulphur trioxide.

Having thus described my invention, I claim

1. The method of sulphonation of benzene which comprises treating benzene with a sulphuric acid containing from 58 to 70 percent free sulphur trioxide.

2. The method of sulphonation of benzene which comprises treating benzene with a sulphuric acid containing 65 percent free sulphur trioxide.

3. The method of sulphonation of benzene which comprises treating benzene with a sulphuric acid containing 65 percent free sulphur trioxide in the proportions of from 2.3 to 2.5 parts by weight of acid per part by weight of benzene.

4. The method of sulphonation of benzene which comprises treating benzene with a sulphuric acid containing from 58 to 70 percent free sulphur trioxide at a final temperature of 275° to 300° C.

5. The method of sulphonation of benzene which comprises treating benzene with a sulphuric acid containing 65 percent free sulphur trioxide in the proportions of from 2.3 to 2.5 parts by weight of acid per part by weight of benzene at a final temperature of 275° to 300° C.

6. In the manufacture of resorcin, the step which comprises sulphonating benzene with a sulphuric acid containing from 58 to 70 percent free sulphur trioxide in the proportions of from 2.3 to 2.5 parts by weight of acid per part by weight of benzene.

7. In the manufacture of resorcin, the step which comprises sulphonating benzene with a sulphuric acid containing 65 percent free sulphur trioxide in the proportions of from 2.3 to 2.5 parts by weight of acid per part by weight of benzene.

8. In the manufacture of resorcin, the step which comprises sulphonating benzene with a sulphuric acid containing from 58 to 70 percent free sulphur trioxide in the porportions of from 2.3 to 2.5 parts by weight of acid per part by weight of benzene at a final temperature of 275° to 300° C.

9. In the manufacture of resorcin, the step which comprises sulphonating benzene with a sulphuric acid containing 65 per cent free sulphur trioxide in the proportions of from 2.3 to 2.5 parts by weight of acid per part by weight of benzene at a final temperature of 275° to 300° C.

10. In the manufacture of resorcin, the step which comprises sulphonating benzene with a sulphuric acid containing from 58 to 70 percent free sulphur trioxide in the proportions of from 2.3 to 2.5 parts by weight of acid per part by weight of benzene and neutralizing the sulphonic acid mixture directly with alkali.

11. In the manufacture of resorcin, the step which comprises sulphonating benzene with a sulphuric acid containing 65 percent free sulphur trioxide in the proportions of from 2.3 to 2.5 parts by weight of acid per part by weight of benzene at a final temperature of 275° to 300° C. and neutralizing the sulphonic acid mixture directly with alkali.

In testimony whereof, I hereby affix my signature.

JOHN MORRIS WEISS.